United States Patent Office 3,074,956
Patented Jan. 22, 1963

3,074,956
OXAZOLINE COMPOUNDS AND METHOD FOR PRODUCING SAME
Robert F. Meyer, Ann Arbor, Mich., assignor to Parke, Davis & Company, Detroit, Mich., a corporation of Michigan
No Drawing. Filed Feb. 8, 1960, Ser. No. 7,138
7 Claims. (Cl. 260—307)

This invention relates to novel oxazoline compounds and to a method of producing same. More particularly, the invention relates to threo-4-hydroxy-methyl-5-p-nitrophenyl-$\Delta^2$-oxazoline compounds having the formula,

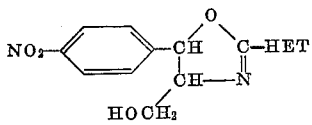

Threo form wherein HET represents a heterocyclic radical of the formula

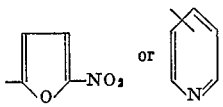

To one skilled in the art it will be apparent that oxazoline compounds having the above structural formula contain two asymmetric carbon atoms and can exist in various isomeric forms. These include diastereoisomeric forms as well as optically isomeric forms. In the products and starting materials of the invention the groups on the two asymmetric carbon atoms have the same relative spatial configuration or arrangement as the groups on the asymmetric carbon atoms of pseudo ephedrine, threose and the amino diol derivable from chloramphenicol by hydrolysis and are consequently referred to as having the threo form. As used herein in both the specification and claims the term "threo" without any accompanying notation is to be interpreted in its generic sense, that is, as representing the D and L-threo compounds in separate form as well as the racemic mixture (DL). Where a particular optical form is intended, a notation will be used with the term "threo" such as e.g. D-threo. It should be noted that the configurational representation of the isomers as D and L refers not to the actual sign of rotation but to the configuration about the asymmetric carbon atoms, DL-threo corresponding to DL-threose, D-threo to D-threose, L-threo to L-threose.

In view of the difficulty of representing the spatial configuration in two-dimensional formulas, conventional structural formulas are used to illustrate the products of the invention and the starting materials from which they are prepared in both the specification and claims along with a notation to designate the stereochemical form.

In accordance with the invention the $\Delta^2$-oxazoline compounds having the formula given above are produced by mild oxidation of the Schiff base derivable from threo-1-p-nitrophenyl-2-aminopropane-1,3-diol and the aldehyde,

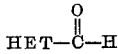

where HET has the same meaning as given above. The reaction can be graphically illustrated as follows:

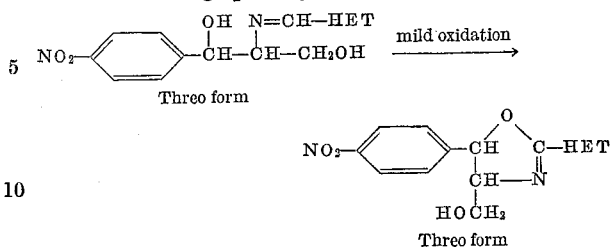

where HET has the same significance as given above.

The reaction is carried out in a solvent medium. Some of the solvent mediums which are suitable are water, lower molecular weight alcohols, lower molecular weight alcohol-water mixtures, N,N-dimethylformamide, pyridine and the like.

A wide variety of mild oxidizing agents can be used. Oxidizing agents furnishing a positive halogen ion in aqueous solution such as e.g. bromine, pyridinium bromide perbromide, N-bromosuccinimide, N-chlorosuccinimide, N-bromoacetamide, 3 - bromodimethylhydantoin, Chloramine B, Chloramine T, Dichloramine T, dioxane dibromide, chloranil, dimedone dibromide, sulfuryl chloride, sodium hypobromite, calcium hypochlorite, tertiary-butylhypochlorite, trifluoroacetyl hypochlorite and the like can be advantageously employed. Examples of still other mild oxidizing agents which can be employed are hydrogen peroxide and a variety of organic peroxides such as e.g. peracetic acid, perbenzoic acid and the like. Particularly good results are obtained by the use of N-bromosuccinimide in pyridine.

The temperature of the reaction is not critical; however, best results are obtained when the reaction is carried out at a temperature below 100° C., and preferably under 50° C.

In carrying out the process the Schiff base starting materials can, if desired, be created in situ by the reaction of the aldehyde,

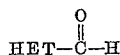

with the threo-1-p-nitrophenyl-2-aminopropane-1,3,-diol and the mild oxidizing agent added to the reaction mixture containing the Schiff base.

The Schiff base employed as starting materials can be prepared by reacting a threo-1-p-nitrophenyl-2-aminopropane-1,3-diol with an aldehyde of formula,

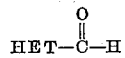

where HET has the same significance as given above.

The compounds of the invention are highly effective against a variety of strains of *Trichomonas vaginalis* and *Trichomonas foetus*, possess low toxicity, and non-irritating to mucosal tissue and find utility as trichomonicides. They may be administered intravaginally in suppository form or orally.

The invention is illustrated by the following examples:

Example 1

204.0 g. (0.635 mole) of pyridinium perbromide hydrobromide is added portionwise to a stirred suspension of 201.2 g. (0.6 mole) of D(—)-threo-1-nitrophenyl-2-(5-nitro-2-furfurylideneamino) propane-1,3-diol in 700 ml. of pyridine while maintaining the temperature at 25–30° C. Stirring is continued for two additional hours and the reaction mixture added dropwise with stirring to 12 l. of ice water. The resulting suspension is stirred an additional hour, the solid allowed to settle and the supernatant liquid separated by decantation. The solid residue is slurried with cold water, filtered and dried in vacuo. A 90 g. portion of the dried solid is digested with 3 l. of boiling ethyl acetate and filtered while hot from the insoluble residue. The filtrate is heated to boiling, charcoaled, and filtered while hot. The D(—)-threo-2-(5-nitro-2-furyl) - 4 - hydroxymethyl - 4 - p-nitrophenyl-$\Delta^2$-oxazoline which separates on cooling is collected, dried, and recrystallized from isopropanol; M.P. 194–195° C. $[\alpha]_D^{27}$ —142° (c, 2% in dioxane).

If desired 83.0 g. of N-bromoacetamide may be substituted for the 204.0 g. of pyridinium perbromide hydrobromide in the above procedure.

The D(—)-threo-1-p-nitrophenyl-2-(5-nitro-2-furfurylideneamino) propane-1,3-diol used as starting material can be prepared in the following manner: A suspension of 212 g. (1 mole) of D(—)-threo-1-p-nitrophenyl-2-aminopropane-1,3-diol in 1.5 l. of water is stirred at 40–45° C. for 15 minutes and cooled to 10° C. A solution of 155 g. (1.1 mole) of 5-nitro-2-furfuraldehyde in 1.5 l. of 95% ethyl alcohol cooled to 10° C. is added to the above suspension over a half-hour period at 10–15° C. Stirring is continued for an additional hour after the addition is completed, the reaction mixture cooled to 5° C. and filtered. The filter cake is washed with several portions of ice water, slurried with 3.5 l. of water at 50° C., filtered and dried at 50° C. in vacuo; M.P. 160–161° C. (dec.).

*Example 2*

A suspension of 21.2 g. (0.1 mole) of D(—)-threo-1-p-nitrophenyl-2-aminopropane-1,3-diol in 125 ml. of pyridine is stirred for fifteen minutes at 25° C. and then cooled to 15° C. A solution of 14.8 g. (0.105 mole) of 5-nitro-2-furfuraldehyde in 125 ml. of pyridine is added dropwise to the D(—)-threo-1-p-nitrophenyl-2-aminopropane-1,3-diol solution keeping the temperature at 15° C. The reaction mixture is stirred for an additional two hours at 10–20° C., 18.7 g. (0.105 mole) of N-bromosuccinimide is added portionwise at 20–25° C. and the stirring continued for an additional hour at 25° C. The reaction mixture is added dropwise with stirring to 3 l. of water at 10° C. The solid is separated by filtration, slurried with cold water, collected and dried. The dried solid is digested with 750 ml. of boiling ethyl acetate, charcoaled, and filtered while hot. The D(—)-threo-2-(5-nitro-2-furyl)-4-hydroxymethyl-5-p-nitrophenyl-$\Delta^2$-oxazoline which separates on cooling is collected by filtration, dried, and recrystallized from isopropanol; M.P. 194–195° C., $[\alpha]_D^{27}$ —142° (c, 2% in dioxane).

If desired, 15 g. of N-chlorosuccinimide can be substituted for the 18.7 g. of N-bromosuccinimide.

*Example 3*

A solution of 7.4 g. (0.05 mole) of 5-nitro-2-furfuraldehyde in 7.4 ml. of N,N-dimethylformamide is added dropwise with stirring over a period of ten minutes to a solution of 10.6 g. of DL-threo-1-p-nitrophenyl-2-aminopropane-1,3-diol in 37.6 ml. of N,N-dimethylformamide at 5° C. The reaction mixture is stirred for an additional hour at 5–10° C. and 4.2 ml. of pyridine added. A solution of 9.4 g. of N-bromosuccinimide in 25 ml. of N,N-dimethylformamide is added portionwise over a period of ten minutes during which time the temperature of the reaction mixture is allowed to rise to 25° C. The reaction mixture is allowed to stand at room temperature for an additional two hours and added slowly to 1.5 liters of ice water. The DL-threo-2-(5-nitro-2-furyl)-4-hydroxymethyl-5-p-nitrophenyl-$\Delta^2$-oxazoline is collected by filtration, washed with ice water, dried and recrystallized from dioxane; M.P. 163–164° C.

If desired, 19.2 g. of pyridinium perbromide hydrobromide may be substituted for the 9.4 g. of N-bromosuccinimide in the above procedure.

*Example 4*

112 g. (0.63 mole) of N-bromosuccinimide is added portionwise to a stirred suspension of 201 g. (0.6 mole) of L(+)-threo-1-p-nitrophenyl-2-(5-nitro-2-furfurylideneamino) propane-1,3-diol in 700 ml. of pyridine while keeping the temperature of the reaction mixture at 30–55° C. The reaction mixture is stirred an additional two hours at 30–55° C. and then added dropwise with stirring to 12 l. of ice water. The resulting suspension is stirred an additional hour and the solid collected by filtration. The wet solid is slurred with 2 l. of ice water, filtered and dried at 60° C. in vacuo. A 100 g. portion of the dried solid is digested with 3.5 l. of boiling ethyl acetate and filtered while hot from the insoluble residue. The filtrate is boiled with charcoal, filtered while hot, and allowed to cool. The L(+)-threo-2-(5-nitro-2-furyl)-4-hydroxymethyl-5-p-nitrophenyl-$\Delta^2$-oxazoline which separates on cooling is collected by filtration, dried and recrystallized from isopropanol; M.P. 194–195° C.; $[\alpha]_D^{27}$ +145° (c, 2% in dioxane).

The L(+)-threo-1-p-nitrophenyl-2-(5-nitro-2-furylideneamino) propane-1,3-diol used as starting material can be prepared in the following manner: A suspension of 212 g. (1 mole) of L(+)-threo-1-p-nitrophenyl-2-aminopropane-1,3-diol in 1.5 l. of water is stirred at 40–45° C. for 15 minutes and cooled to 10° C. A solution of 155 g. (1.1 mole) of 5-nitro-2-furfuraldehyde in 1.5 l. of 95% ethyl alcohol cooled to 10° C. is added to the above suspension over a half-hour period at 10–15° C. Stirring is continued for an additional hour after the addition is completed, the reaction mixture cooled to 5° C. and filtered. The filter cake is washed with several portions of ice water, slurried with 3.5 l. of water at 50° C., filtered and dried at 60° C. in vacuo; M.P. 160–162° C. (dec.).

*Example 5*

15.2 g. of N-bromosuccinimide is added portionwise with stirring to a suspension of 24.7 g. of D(—)-threo-1-p - nitrophenyl - 2 - (2 - pyridylmethyleneamino)-propane-1,3-diol in 70 ml. of pyridine at a temperature below 50° C. The reaction mixture is stirred an additional hour and added slowly to a stirred crushed ice-water mixture. The D(—)-threo-2-(2-pyridyl)-4-hydroxymethyl-5-p-nitrophenyl-$\Delta^2$-oxazoline is collected by filtration, washed with water, dried and recrystallized from ethyl alcohol; M.P. 187–189° C.

The D(—)-threo-1-p-nitrophenyl-2-(2-pyridylmethyleneamino) propane-1,3-diol used as starting material can be prepared by the following method: A solution of 11 g. of pyridine-2-aldehyde is added slowly to a refluxing solution of 21 g. of D(—)-threo-1-p-nitrophenyl-2-aminopropane-1,3-diol in 300 ml. of ethyl alcohol and the reaction mixture concentrated to a volume of approximately 200 ml. on a steam bath. The concentrated solution is cooled in an ice-salt bath and the D(—)-threo-1-p-nitrophenyl - 2-(2-pyridylmethyleneamino) propane-1,3-diol collected by filtration and dried; M.P. 161–162° C.

*Example 6*

15.7 g. of N-bromosuccinimide is added portionwise with stirring to a suspension of 25.4 g. of D(—)-1-p-nitrophenyl-2-(3-pyridylmethyleneamino)propane-1,3-diol in 70 ml. of pyridine keeping the temperature between 50 and 60° C. The reaction mixture is stirred for an additional hour and then added slowly to a stirred mixture of ice and water. The D(—)-threo-2-(3-pyridyl)-4-hydroxymethyl-5-p-nitrophenyl-$\Delta^2$-oxazoline is collected by filtration and recrystallized from ethyl alcohol; M.P. 198–199° C.

By substituting 24.7 g. of L(+)-threo-1-p-nitrophenyl-2-(3-pyridylmethyleneamino) propane-1,3-diol and 24.7 g. of DL-threo-1-p-nitrophenyl-2-(3-pyridylmethyleneamino) propane-1,3-diol for the D(−)-threo-1-p-nitrophenyl-2-(3-pyridylmethyleneamino) propane-1,3diol in the above procedure one obtains L(+)-threo-2-(3-pyridyl) - 4-hydroxymethyl-5-p-nitrophenyl-Δ²-oxazoline and DL - threo - 2-(3-pyridyl)-4-hydroxymethyl-5-p-nitrophenyl-Δ²oxazoline, respectively.

The D(−)-threo-1-p-nitrophenyl-2-(3-pyridyl-methyleneamino) propane-1,3-diol used as starting material can be prepared in the following manner: A solution of 11 g. of pyridine-3-aldehyde is added slowly to a refluxing solution of 21 g. of D(−)-threo-1-p-nitrophenyl-2-aminopropane-1,3-diol in 300 ml. of ethyl alcohol. The reaction mixture is concentrated to a volume of approximately 200 ml. on a steam bath and the concentrated solution cooled in an ice-salt bath. The D(−)-threo-1-p-nitrophenyl - 2 - (3-pyridylmethyleneamino) propane-1,3-diol which separates is collected by filtration and recrystallized from absolute ethyl alcohol; M.P. 164–165° C.

Example 7

9.4 g. of N-bromosuccinimide is added portionwise with stirring to 15 g. of L(+)-threo-1-p-nitrophenyl-2-(4-pyridylmethylenamino) propane-1,3-diol dissolved in 70 ml. of pyridine. The reaction mixture is heated on a steam bath until the precipitate dissolves and the solution added slowly with stirring to a mixture of ice and water. The L(+)-threo-2-(4-pyridyl)-4-hydroxymethyl-5-p-nitrophenyl-Δ²-oxazoline which separates is collected by filtration and recrystallized from ethyl alcohol; M.P. 231–232° C.

By substituting 15 g. of D(−)-threo-1-p-nitrophenyl-2-(4-pyridylmethyleneamino) propane-1,3-diol and 15 g. of DL - threo-1-p-nitrophenyl-2-(4-pyridylmethyleneamino) propane-1,3-diol for the 15 g. of L(+)-threo-1-p-nitrophenyl - 2-(4-pyridylmethyleneamino) propane-1,3-diol in the procedure described above, D(−)-threo-2-(4-pyridyl) - 4-hydroxymethyl-5-p-nitrophenyl-Δ²-oxazoline and DL - threo-2-(4-pyridyl)-4-hydroxymethyl-5-p-nitrophenyl-Δ²-oxazoline, respectively are obtained.

The L(+)-threo-1-p-nitrophenyl-2-(4-pyridyl-methyleneamino) propane-1,3-diol used as starting material can be prepared as follows: A solution of 10.7 g. of pyridine-4-aldehyde in ethyl alcohol is added slowly to a refluxing slurry of 21.2 g. of L(+)-threo-1-p-nitrophenyl-2-aminopropane-1,3-diol in 300 ml. of ethyl alcohol. The reaction mixture is refluxed for an additional hour, concentrated to 100 ml. and cooled. The L(+)-threo-1-p-nitrophenyl-2-(4-pyridylmethyleneamino) propane-1,3-diol is collected by filtration and recrystallized from ethyl alcohol; M.P. 172–173° C.

Example 8

15 g. of peracetic acid is added portionwise to a stirred suspension 20.0 g. of D(−)-threo-1-(p-nitrophenyl)-2-(5-nitro-2-furfuryl-deneamino)-1,3-propanediol in 100 ml. of acetone at 45° C. Stirring is continued for four additional hours at room temperature and then added dropwise to a stirred mixture of ice and water. The solid which separates is collected by filtration, washed with water and dried in vacuo. A 9 g. portion of the dried solid is digested with 300 ml. of boiling ethyl acetate. A small amount of charcoal is added and the mixture filtered while hot. The D(−)-threo-2-(5-nitro-2-furyl)-4-hydroxy-methyl-5-p-nitrophenyl-Δ²-oxazoline which separates from the filtrate on cooling is collected by filtration, dried and recrystallized from isopropanol; M.P. 194–195° C.; $[\alpha]_D^{27}$ −142° (c, 2% in dioxane).

Example 9

20 ml. of an aqueous solution of hydrogen peroxide (30% strength) is added portionwise to a stirred suspension of 20.0 g. of L(+)-threo-1-(p-nitrophenyl)-2-(5-nitro-2-furfurylideneamino)-1,3-propanediol in 100 ml. of aqueous sodium hydroxide (pH=9) while keeping the temperature between 50 and 60° C. The mixture is stirred for an additional hour and the suspended solid collected by filtration, washed with water, and dried in vacuo. A 9 g. sample of the dried product is digested with 300 ml. of boiling ethyl acetate. A small amount of charcoal is added and the mixture filtered while hot. Upon cooling, the L(+)-threo-2-(5-nitro-2-furyl)-4-hydroxymethyl-5-p-nitrophenyl-Δ²-oxazoline separates from the filtrate. The product is collected by filtration dried and recrystallized from isopropanol; M.P. 194–195° C.; $[\alpha]_D^{27}$+145° (c, 2% in dioxane).

Example 10

44.3 g. of lead tetraacetate is added to a stirred suspension of 20.0 g. of D(−)-threo-1-(p-nitrophenyl)-2-(2-pyridylmethyleneamino)-1,3-propanediol in 100 ml. of glacial acetic acid at room temperature. The reaction mixture is stirred an additional 48 hours and then added dropwise to a stirred crush ice-water mixture. The precipitate is collected, slurried in cold water, collected by filtration and dried in vacuo. The dried product is digested with boiling ethanol. The ethanol solution is charcoaled and filtered while hot. The ethanol filtrate is concentrated and, the D(−)-threo-2-(4-pyridyl)-4-hydroxymethyl-5-p-nitrophenyl-Δ²-oxazoline which separates collected and dried; M.P. 187–189° C.

Example 11

32.5 g. bromine is added portionwise to a stirred suspension of 25 g. of L(+)-threo-1-p-nitrophenyl-2-(4-pyridylmethyleneamino) propane-1,3-diol and 21.5 g. of sodium carbonate in 250 ml. of water at a temperature between 45° and 50° C. Stirring is continued an additional two hours and the suspended solid separated by filtration, slurried in cold water, collected by filtration and dried in vacuo. The dried solid is digested with ethyl alcohol, the ethyl alcohol solution charcoaled and filtered while hot. The ethanol filtrate is concentrated and the L(+)-threo-2-(4-pyridyl) - 4 - hydroxymethyl-5-p-nitrophenyl-Δ²-oxazoline which separates collected and dried; M.P. 231–232° C.

What is claimed is:

1. D(−)-threo-2-(5 - nitro-2-furyl)-4-hydroxymethyl-5-p-nitrophenyl-Δ²-oxazoline.
2. DL-threo-2-(5-nitro-2-furyl) - 4 - hydroxymethyl-5-p-nitrophenyl-Δ²-oxazoline.
3. L(+)-threo-2-(5-nitro-2-furyl) - 4 - hydroxymethyl-5-p-nitrophenyl-Δ²-oxazoline.
4. A compound of the formula,

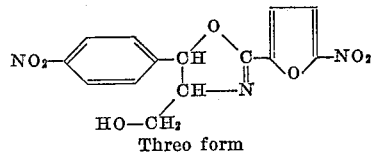

Threo form

5. Process for the production of a compound of the formula,

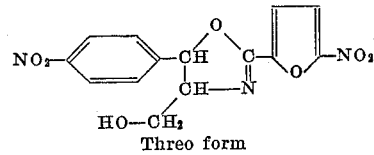

Threo form which comprises reacting a Schiff's base of the formula,

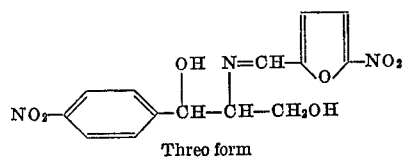

Threo form with a mild oxidizing agent in a basic solvent medium at a temperature below 50° C.

6. A process according to claim 5 wherein the oxidizing agent is a halogen compound furnishing a positive halogen ion in aqueous solution.

7. A process according to claim 5 wherein the oxidizing agent is N-bromosuccinimide.

References Cited in the file of this patent

UNITED STATES PATENTS 2,281,583   Kranzlein _____ May 5, 1942

FOREIGN PATENTS 896,808   Germany _____ Nov. 16, 1953
704,946   Great Britain _____ Mar. 3, 1954

OTHER REFERENCES

J. Am. Pharm. Assoc., vol. 33, p. 195 (1944).
Biemann: Chem. Abstracts, vol. 50, col. 4950 (1956).
Alberti et al.: Chem. Abstracts, vol. 51, col. 17808 (1957).